United States Patent
Cargill et al.

(10) Patent No.: US 6,663,822 B1
(45) Date of Patent: Dec. 16, 2003

(54) ARTICLE AND MANUFACTURING PROCESS FOR ARTICLE HAVING INDIVIDUAL MATERIAL PROPERTIES

(75) Inventors: Lynn E. Cargill, Mt. Clemens, MI (US); Robin L. Pointer, St. Clair Shores, MI (US)

(73) Assignee: 3Dm Technologies, Inc., Mt. Clemens, MI (US)

( * ) Notice: Subject to any disclaimer, the term of this patent is extended or adjusted under 35 U.S.C. 154(b) by 0 days.

(21) Appl. No.: 09/937,291
(22) PCT Filed: Mar. 24, 2000
(86) PCT No.: PCT/US00/07730
§ 371 (c)(1), (2), (4) Date: Sep. 24, 2001
(87) PCT Pub. No.: WO00/56520
PCT Pub. Date: Sep. 28, 2000

Related U.S. Application Data

(60) Provisional application No. 60/125,955, filed on Mar. 24, 1999.

(51) Int. Cl.$^7$ .......................... B29C 49/22; B29C 49/04
(52) U.S. Cl. ...................... 264/515; 264/912; 264/917; 264/920; 428/34.4; 428/34.7; 428/36.91
(58) Field of Search ................................. 264/515, 912, 264/917, 920; 428/34.4, 34.7, 36.91

(56) References Cited

U.S. PATENT DOCUMENTS

| | | |
|---|---|---|
| 3,184,358 A | 5/1965 | Utz |
| 4,239,474 A | 12/1980 | Nakagawa |
| 4,362,688 A | 12/1982 | Nakagawa |
| 4,659,531 A | 4/1987 | Ezski |
| 4,890,994 A | 1/1990 | Shapler et al. |
| 4,907,957 A | 3/1990 | Nakagawa et al. |
| 5,085,821 A | 2/1992 | Nohara |
| 5,156,796 A | 10/1992 | Nakagawa et al. |
| 5,198,174 A | 3/1993 | Nakagawa et al. |
| 5,712,003 A | 1/1998 | Suenaga et al. |
| 6,294,234 B1 * | 9/2001 | Kertesz .................... 428/34.7 |

FOREIGN PATENT DOCUMENTS

| | | |
|---|---|---|
| EP | 0 063 378 | 10/1982 |
| EP | 0 300 385 | 1/1989 |
| GB | 801419 | 9/1958 |

* cited by examiner

Primary Examiner—Suzanne E. McDowell
(74) Attorney, Agent, or Firm—Lynn E. Cargill

(57) ABSTRACT

A process for manufacturing an article (10) by forming different portions of the article from different materials including using filler materials that are incorporated into a molten resin prior to forming the article. The selection of the resin and the filler materials impart differing properties to the article in the location where the materials were directed. The filler materials may include ceramic powders, clays, polymeric resins selected for their material properties, recycled materials, whisker materials and the like. The article may be subjected to an adhesion fluid, such as a gas or liquid, after formation in order to adhere all filler particles to the surrounding resin. If the adhesion treatment is acidic in nature, an optional step of neutralizing the article with hydroxides, carbonates or the like may be useful. An article (10) made by the process includes multiple materials located in various positions (12, 26, 30, 34) around the article especially useful to have portions that may be electrically, thermally, magnetically conductive or insulative, or the properties may need to include surface texture, catalytic surface inclusions, or adhesion properties.

3 Claims, 1 Drawing Sheet

ARTICLE AND MANUFACTURING PROCESS FOR ARTICLE HAVING INDIVIDUAL MATERIAL PROPERTIES

This application claims the benefit of provisional application Ser. No. 60/125,955 filed Mar. 24, 1999.

The present invention relates to manufactured articles made of at least two different materials, including filler materials to provide individual material properties, and more particularly relates to wholly or partially hollow members made by three-dimensional blow molding comprising at least two different materials having individual material properties.

BACKGROUND OF THE INVENTION

Three-dimensional blow molding is a known technique in the art for producing articles having tri-axially oriented configured shapes with hollow interiors. Within this art area, it is known to include multi-segmented parisons, or laminated parisons in order to produce multi-layered molded articles. While it has been known in the traditional biaxial (or two dimensional) blow molding and the injection molding arts to use more than one molding resin in order to achieve the abovementioned multiple layers or segments, the relatively new art area of three-dimensional blow molding has introduced a whole new set of problems in terms of the selection, compatibility, adhesion, and formability of molded articles when trying to incorporate segmented or layered materials.

With the desire to reduce the number of parts assembled into an automobile or other manufactured items, it is preferable to produce and process manufactured articles which are formed of many materials in one article, rather than be assembled out of numerous parts made of the individually desired materials. For example, an airflow tube used in automotive applications used to be comprised of rigid plastic portions, flanged to a soft rubber bellows portion for flexibility, and attached via hose clamps to other automotive components.

Automobile manufacturers are desirous of purchasing an airflow tube that already has all of these material components in one unit which can be assembled into a car much more easily. In addition, the automobile manufacturer has found that it is much less expensive to stock, inventory, catalog, and approve the vendors for numerous articles. Rather than dealing with multiple parts, it is much easier for automotive manufacturers to stock, inventory and catalog a single part. Furthermore, they only need to qualify a single vendor, rather than numerous vendors.

Consequently, three-dimensional blow molding has been of great interest to the automobile manufacturers because of their ability to form complex shapes without wasting material, although the cycling time may be too long for advantageous production of basic plastic parts. However, new techniques for decreasing the cycling time are in progress, and the inclusion of multi-property materials may reduce the overall production times when compared to the production of a multiple of parts assembled together thereafter.

Standard three-dimensional or triaxially oriented blow molding processes are known in the art. A parison or tube is formed by the injection of a plasticized material around a hollow mandrel. While the material is still molten and still on the mandrel, it is transferred into a blowing mold where air is used to inflate it. In three-dimensional blow molding, the parison is placed or directed into a three-dimensional mold prior to being cured into a substantially rigid or stiff element.

Although it is known to produce three dimensionally blow molded multi-segmented hollow parts that incorporate hard and soft materials, there are many aspects of incorporating new and different materials into the length, walls, and portions of the hollow parts which are not known to have been explored. It is this aspect of utilizing multiple materials having varying properties which is the subject of the instant invention.

SUMMARY OF THE INVENTION

It is, therefore, desirable to provide a blow molding process and resultant article that will achieve the goals mentioned above. The desirable properties that are addressed by the present invention include electrically conducting and insulating properties, magnetically oriented materials, thermally dissipative or conducting properties, shrinkage factor differences, coloring and pigmented differences, varying compressive and tensile strengths, vapor permeability, chemical inertness and reactivity coefficients, textures, catalytic surfacing effects among other new properties.

Examples of articles which can be made by the present process invention are automotive parts including air flow tubes, console lids, knee bolsters, instrument panel components, fire walls with HVAC ducts already in place, radiator gaskets for high temperature resins with ceramic filler components, HVAC valves, numerous under the hood items such as manifolding, fuel injection systems, and fuel tanks which can be blow molded with rock shields integral to the unit. Non-automotive parts can include computer cases, utilizing the electrically conductive materials, thermally dissipative and magnetically insulative materials; as well as electronic components such as radios, cable TV boxes and the like. Non-electronic applications may include water filter casings which would utilize the features of anti-microbial inclusions within the materials to ward off germs forming on the surface in contact with the water. The other applications are too numerous to mention.

In the manufacture of the above mentioned blow molded examples, the present invention seeks to provide an arrangement for various materials longitudinally, vertically, and regionally throughout the length of the parison being made and directed into the three-dimensional blow mold prior to curing and setting. The present invention can also find utility in the field of injection molding, merely translating the various materials into the materials being injected.

The different materials can include:

1. All resins suitable for injection molding, three dimensional blow molding, biaxial blow molding and vacuum molding, including, but not limited to polyesters, polypropylene, polyethylene, polyester terphthalate, butadiene-styrene copolymers, polyamides, ethylene-vinyl-alcohol copolymer, polyethylene napthaphthalate, thermoplastic and thermosetting resins, polybutylene terephthalate, polyoxymethylenes, polycarbonates, polyphenylene, polyphenylene sulfides, polyphenylene oxides, polymethylmethacrylate, polyethylene-terephthalate, polyvinylidenechloride, polymethylpentene-1, nylon 6, nylon 66, and others;

2. All naturally occurring and all manufactured ceramics, including, but not limited to, ceramics selected from the group consisting of silicon nitride, silicon carbide, alumina, boron carbide, tungsten carbide, and other carbides, nitrides and oxides of various metals to be chosen for their various properties, whether in powder, whisker, low aspect talc form, or any other form which can be incorporated into the parison, either by itself if it can be slip casted, injection molded or extruded, or along with a resin in order to be incorporated into the bulk of the parison material;

3. Various other particulate materials including clays such as kaolin, cordierite, mullite; metal flakes such as iron filings, steel chips, magnetic filings, magnetic particles and various other surface enhancing metal particulates; pulverized road construction particulates including stone chips, crushed slag, crushed concrete, cracked and crushed heavy road tars, and the like; crumbed rubber tires, densified foam chips, recycled materials to be used as filler or as property enhancers, such as fibers from cardboard and other paper products, crumbed soda pop bottles; and other filler materials to add inexpensively to the volume of material or to impart strength such as glass fibers for reinforcement, silicon carbide whiskers for added strength and thermal resistivity.

The instant invention also calls for the optional use of an adhesion gas, such as a sulfur-containing sulfonation gas, so that the materials can be molecularly adhered to one another to form a very strong bond via the adhesion gas application during the "blow" portion of the blow molding operation. Thereafter, the part may be subjected to a neutralizing agent, in order to finish the part.

Articles resulting from the above process are composed of multiple materials, and may include numerous wholly or partially hollow parts such as various automotive parts, including air flow tubes. Examples of the resulting articles follow in the Examples section below.

Therefore, the advantages of the present invention are fully realized when practicing the process of the present invention and the articles resulting therefrom.

DETAILED DESCRIPTION OF THE INVENTION

Figure 1:
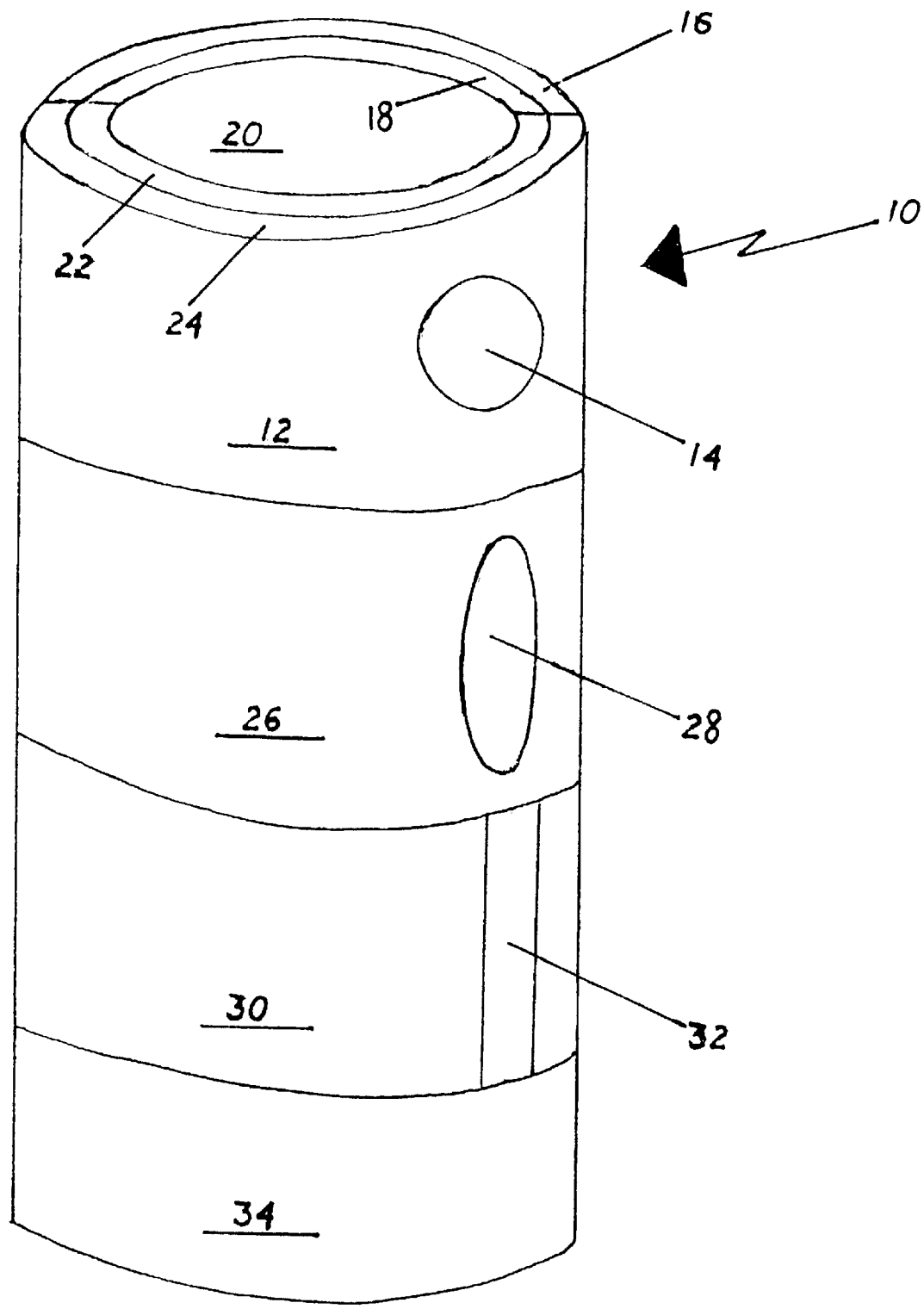
FIG. 1 is an illustration of a possible combination parison having differing materials with various properties.

In accordance with the present invention, the process for manufacturing a multiple material molded part and the article resulting therefrom are described below. The advantages of the instant invention are that a single, unitary part can have numerous properties in locations where those properties are needed. In other words, those properties can be had in a single part, without the need to construct numerous parts and attach them to one another. This greatly simplifies assembly, perfectly seals the points of attachment seamlessly, and bonds the various materials together during manufacturing, thereby lowering overall labor costs dramatically.

First, with reference to FIG. 1, there can be seen a perspective view of a cutaway portion of a typical parison utilized in blow molding with many of the possible configurations of the placement of varying materials throughout the length and cross-section of the parison. As was noted earlier, the present invention also finds application in the injection and vacuum molding arts, although this example and drawing relates to blow molding, either biaxial or three dimensional.

FIG. 1 shows a hypothetical cutaway portion of a parison to illustrate the possible configurations available under the present invention. It is not anticipated that any real parison would contain so many different layers, segments, and regions. With these thoughts in mind, the parison of FIG. 1 is generally denoted by the numeral 10, including a segment 12 of a first material with a region 14 of a different material having been extruded out of a slit in the die head which was injected with a separate material source. Longitudinally, sections 16 and 18 are also different materials having been simultaneously co-extruded into the parison on the opposite side of the parison from longitudinal multi-layer sections 22 and 24, which are also depicted as different materials. All of these regions could be extruded from a single point source, with a nozzle for the source reaching to the die head, oriented in such a fashion that the precise amount of material would be deposited in the proper orientation after it came out of the die head. These regions 14, 28 and 32 may be made by the formation of a slit extruder, and properly timed injection of material, forming a circle 14, an ellipse 28, and a straight line 32, depending on the material flow out volume, time taken before allowing the parison to drop, and the interrelation between these two factors.

Multiple segments 12, 26, 30 and 34 could each be of a different material, and included in the parison by utilizing a different nozzle for each which could be connected to the die head, releasing varying materials around the circumference of the parison as it is dropped from the mandrel. This process can also be used to place varying materials as detailed herein in particular locations around the circumference.

The process of the present invention includes the extrusion of individual materials selected for their individual properties depending on the ultimate application desired.

The different materials can include:

1. All resins suitable for injection molding, three dimensional blow molding, biaxial blow molding and vacuum molding, including, but not limited to polyesters, polypropylene, polyethylene, polyester terphthalate, butadiene-styrene co-polymers, polyamides, ethylene-vinyl-alcohol copolymer, polyethylene napthaphthalate, thermoplastic and thermosetting resins, polybutylene terephthalate, polyoxymethylenes, polycarbonates, polyphenylene, polyphenylene sulfides, polyphenylene oxides, polymethylmethacrylate, polyethylene-terephthalate, polyvinylidenechloride, polymethylpentene-1, nylon 6, nylon 66, and others;

2. All naturally occurring and all manufactured ceramics, including, but not limited to, ceramics selected from the group consisting of silicon nitride, silicon carbide, alumina, boron carbide, tungsten carbide, and other carbides, nitrides and oxides of various metals to be chosen for their various properties, whether in powder, whisker, low aspect talc form, or any other form which can be incorporated into the parison, either by itself if it can be slip casted, injection molded or extruded, or along with a resin in order to be incorporated into the bulk of the parison material;

3. Various other particulate materials including clays such as kaolin, cordierite, mullite; metal flakes such as iron filings, steel chips, magnetic filings, magnetic particles and various other surface enhancing metal particulates; pulverized road construction particulates including stone chips, crushed slag, crushed concrete, cracked and crushed heavy road tars, and the like; crumbed rubber tires, densified foam chips, recycled materials to be used as filler or as property enhancers, such as fibers from cardboard and other paper products, crumbed soda pop bottles; and other filler materials to add inexpensively to the volume of material or to impart strength such as glass fibers for reinforcement, silicon carbide whiskers for added strength and thermal resistivity.

The instant invention also calls for the optional use of an adhesion gas, such as a sulfur-containing sulfonation gas, utilizing di- and tri-sulfonic acids, including fuming gaseous sulfuric acid and sulfur trioxide, both by itself and with an inert carrier gas such as nitrogen, carbon dioxide, dry air, argon, $SO_2$; a nitrogen-containing nitriding gas such as either pure nitrogen gas, ammonia gas, mixes of nitrogen, hydrogen and/or helium gas; or water vapor in the form of steam; to be injected into the chosen material combinations in order to cause in-situ cross bonding within the various materials between the carbon atoms of the resin and the oxygen, nitrogen or metallic atoms of the mixed in additional component.

After the process of multiply injecting various materials into the die head to form the parison, the materials can be molecularly adhered to one another to form a very strong bond via the adhesion gas application during the "blow" portion of the blow molding operation. Momentary contact is necessary for the adhesion gas to penetrate the relatively thin layers of materials present in a parison. The "blow" gas source can be attached to a sulfonation or other suitable gaseous supply instead of being attached to a dry shop air source. Moreover, combinations of gases may be most advantageous depending on the combination of materials being selected. Recycling of the adhesion gas would be a simple matter to tend to as the "blow" gas is contained and should be able to be recovered in its entirety.

Thereafter, depending upon the adhesion gas or solution used, it may be found to be advantageous to neutralize the acidic effects of the adhesion medium by subjecting the newly formed part to a neutralizing agent such as ammonia gas (if a sulfonating agent was used), aqueous solutions of hydroxides, carbonates, metallic salts, acetates, or any other known neutralizing agent. The resulting three-dimensional blow molded part will be made of all appropriate materials, optionally bonded at a molecular level to better adhere the various materials to one another, and further optionally neutralized in order to get a fully conditioned part. This part will be a fully integrated unit containing all necessary materials within the single part.

EXAMPLE 1

A fully integrated fire wall complete with intact HVAC ducts in place would be made by three dimensional blow molding if a polyoxymethylene resin is used for the fire wall portion of the mold. The polyoxymethylene would be filled with silicon nitride powder to a fill factor of between 40 to 50 volume percent. The heat resistivity would have a very high value, making this an acceptable and desirable part.

EXAMPLE 2

An integrated heat release board would be manufactured as a computer component by injection molding if a polyurethane resin was filled to between 30 and 40 volume percent of aluminum nitride powder having a mesh size of between 0.05 mesh and 0.01 mesh size. At this filling ratio, a heat release board would be produced having a thermal conductivity suitable for consumer use.

EXAMPLE 3

A fuel tank having a rock shield integral thereon could be made from an ABS plastic having a ceramic or clay filler of between 10 and 30 volume percent, the ceramic or clay having particles with a high aspect ratio, on the order of 5 to 20. Fine road debris could be incorporated into the lower most portion of the fuel tank so as to act as a rock shield. The fuel tank would be filled with tri-sulfonic gas ($SO_3$) to crosslink the polymer to provide a vapor barrier to prevent out gassing through the fuel tank by the gasoline.

EXAMPLE 4

A cushion mat would be made by molding fine crumb rubber from recycled automotive tires into a polyester or polyurethane resin. After formation, the mat would be subjected to a sulfonation gas procedure, resulting in the rubber becoming tacky and adhering to the resin. The fill factor of the crumb rubber to resin would be on the order of between about 60 and 95 volume percent. A suitable cushion mat would result with appropriate integrity for a consumer product.

INDUSTRIAL APPLICABILITY

The present invention has industrial applicability in the manufacture of automotive parts, computer components, electronic components, consumer items and any application which could use an article having different material properties at different locations on the surface of the article.

What is claimed is:

1. A process for biaxially and triaxially blow molding an integrated article by forming different portions of the resultant article from different materials having individual material properties such as thermal and chemical resistance, magnetic properties, electrical resistance/conductance, mechanical abrasion resistance, catalytically active surface and other material properties, the process comprising:

forming a continuous parison including at least two polymeric resinous materials with a filler material in at least one of the polymeric resinous materials incorporated therein, directing at least one extrusion nozzle carrying a first material to a die head, and directing at least one more extrusion nozzle carrying a second material to the same die head, said parison having a length and a circumference to be blow molded into resultant articles;

extruding the at least two materials from the die head said at least two materials being selected from the group consisting of polyesters, polypropylene, polyethylene, polyester terphthalate, butadiene-styrene co-polymers, polyamides, ethylene-vinyl-alcohol copolymer, polyethylene napthaphthalate, thermoplastic and thermosetting resins, polybutylene terephthalate, polyoxymethylenes, polycarb-onates, polyphenylene, polyphenylene sulfides, polyphenylene oxides, polymethylmethacrylate, polyethylene-terephthalate, polyvinylidenechloride, polymethylpentene-1, nylon 6, nylon 66, and mixtures thereof;

mixing filler materials into at least one of the two polymeric resinous materials being extruded such that various materials having individual material properties become incorporated into the resultant article at various locations along the length and circumference of the parison so that those various properties are formed into the article where the properties are needed, the filler materials being selected from the group consisting of all naturally occurring and all manufactured ceramics selected from the group consisting of silicon nitride, silicon carbide, alumina, boron, carbide, tungsten carbide, carbides, nitrides and oxides of various metals to be chosen for their various properties, kaolin, cordierite, mullite, metal flakes, iron filings, steel chips, magnetic filings, magnetic particles, surface enhancing metal particulates, pulverized road construction particulates, stone chips, crushed slag, crushed concrete, cracked and crushed heavy road tars, crumbed rubber tires, densified foam chips, recycled materials to be used as filler and property enhancers, fibers from cardboard/paper products, crumbed soda pop bottles and glass fiber strength imparting filler materials for reinforcement, whereby a fully integrated article of manufacture is formed having individual material properties in desired places within the resultant blow molded article.

2. The process of claim 1, further comprising the application of an adhesion gas to the manufactured article.

3. An article of manufacture made by the process of claim 1.

* * * * *